US006432344B1

(12) United States Patent
Eckman et al.

(10) Patent No.: US 6,432,344 B1
(45) **Date of Patent: *Aug. 13, 2002**

(54) METHOD OF MAKING AN IMPROVED POLYMERIC IMMERSION HEATING ELEMENT WITH SKELETAL SUPPORT AND OPTIONAL HEAT TRANSFER FINS

(75) Inventors: Charles M. Eckman, Dallas, PA (US); James S. Roden, Montgomery, AL (US)

(73) Assignee: Watlow Polymer Technology, Winona, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,017

(22) Filed: Nov. 4, 1998

Related U.S. Application Data

(60) Division of application No. 08/755,836, filed on Nov. 26, 1996, now Pat. No. 5,835,679, which is a continuation-in-part of application No. 08/365,920, filed on Dec. 29, 1994, now Pat. No. 5,586,214.

(51) Int. Cl.[7] .......................... B29C 45/14; B29C 70/70

(52) U.S. Cl. ............. 264/263; 264/272.11; 264/272.15; 264/275

(58) Field of Search ........................ 264/272.11, 272.15, 264/250, 254, 255, 265, 263, 267, 273, 275; 392/503, 500, 497; 338/318, 286

(56) References Cited

U.S. PATENT DOCUMENTS

| | | | | |
|---|---|---|---|---|
| 299,802 A | * | 6/1884 | Kipper | |
| 579,611 A | | 3/1897 | Smith | 392/451 |
| 1,043,922 A | | 11/1912 | Gold | 219/523 |
| 1,046,465 A | | 12/1912 | Hoyt | |

(List continued on next page.)

FOREIGN PATENT DOCUMENTS

| | | |
|---|---|---|
| DE | 35 12 659 A | 9/1986 |
| DE | 3512659 | 10/1986 |
| DE | 38 36 387 C1 | 5/1990 |
| GB | 14562 | 9/1913 |

(List continued on next page.)

OTHER PUBLICATIONS

"Polymers", *Guide to Selecting Engineered Materials*, a special issue of *Advanced Materials & Processes*, Metals Park, OH, ASM International, 1989, pp. 92–93.

"Makroblend Polycarbonate Blend, Tedur Polyphenylene Sulfide", *Machine Design: Basics of Design Engineering*, Cleveland, OH, Penton Publishing, Inc., Jun. 1991, pp. 820–821, 863, 866–867.

European Search Report, Jul. 13, 1998.

(List continued on next page.)

*Primary Examiner*—Angela Ortiz
(74) *Attorney, Agent, or Firm*—Duane Morris LLP

(57) ABSTRACT

Electrical resistance heating elements, hot water heaters containing such elements, and methods of preparing such elements are provided. The electrical resistance heating elements of this invention can be disposed through a wall of a tank for heating fluid, such as water. They include a skeletal support frame having a first supporting surface thereon. They also include a resistance wire wound onto the first supporting surface and preferably connected to at least a pair of terminal end portions. The support frame and resistance wire are then hermetically encapsulated and electrically insulated within a thermally-conductive polymeric coating. The skeletal support frame of this invention improves injection molding operations for encapsulating the resistance wire, and can include heat transfer fins for improving thermal conductivity.

3 Claims, 6 Drawing Sheets

U.S. PATENT DOCUMENTS

| | | | | | |
|---|---|---|---|---|---|
| 1,058,270 | A | | 4/1913 | Stephens | 219/217 |
| 1,281,157 | A | | 10/1918 | Hadaway, Jr. | |
| 1,477,602 | A | | 12/1923 | Simon | |
| 1,674,488 | A | | 6/1928 | Tang | |
| 1,987,119 | A | | 1/1935 | Long | 219/39 |
| 1,992,593 | A | | 2/1935 | Whitney | 219/46 |
| 2,104,848 | A | | 1/1938 | Clark | 392/451 |
| 2,124,923 | A | | 7/1938 | Goldstein | 128/227 |
| 2,146,402 | A | | 2/1939 | Morgan | 219/523 |
| 2,202,095 | A | | 5/1940 | Delhaye et al. | 219/217 |
| 2,255,527 | A | | 9/1941 | Locke | D23/342 |
| 2,274,445 | A | | 2/1942 | Greer | 219/38 |
| 2,426,976 | A | | 9/1947 | Taulman | 219/19 |
| 2,428,899 | A | | 10/1947 | Wiegard | 219/468 |
| 2,456,343 | A | | 12/1948 | Tuttle | 201/67 |
| 2,464,052 | A | | 3/1949 | Numrich | 219/38 |
| 2,593,087 | A | | 4/1952 | Baggett | 219/217 |
| 2,593,459 | A | | 5/1952 | Johnson | 219/39 |
| 2,710,909 | A | | 6/1955 | Logan et al. | 219/46 |
| 2,719,907 | A | | 10/1955 | Combs | 219/46 |
| 2,804,533 | A | | 8/1957 | Nathanson | 219/522 |
| 2,846,536 | A | | 8/1958 | Draymand | 219/501 |
| 2,889,439 | A | | 6/1959 | Musgrave | 219/19 |
| 2,938,992 | A | | 5/1960 | Crump | 219/46 |
| 3,061,501 | A | | 10/1962 | Dittman et al. | 156/250 |
| 3,102,249 | A | | 8/1963 | Schulz | 338/316 |
| 3,173,419 | A | | 3/1965 | Dubilier et al. | 128/399 |
| 3,191,005 | A | | 6/1965 | Cox | 219/528 |
| 3,201,738 | A | | 8/1965 | Mitoff | 338/238 |
| 3,206,704 | A | | 9/1965 | Hay | 338/315 |
| 3,211,203 | A | | 10/1965 | Creed et al. | 146/81 |
| 3,238,489 | A | | 3/1966 | Hay | 388/250 |
| 3,268,846 | A | | 8/1966 | Morey | 338/212 |
| 3,275,803 | A | * | 9/1966 | True | |
| 3,296,415 | A | | 1/1967 | Eisler | 219/385 |
| 3,352,999 | A | | 11/1967 | Macoicz et al. | 219/321 |
| 3,374,338 | A | | 3/1968 | Morey | 219/529 |
| 3,384,852 | A | | 5/1968 | Beck | 338/316 |
| 3,385,959 | A | | 5/1968 | Ames et al. | |
| 3,496,517 | A | | 2/1970 | Walter | 339/18 |
| 3,535,494 | A | | 10/1970 | Armbruster | 219/528 |
| 3,564,589 | A | | 2/1971 | Arak | 219/331 |
| 3,573,430 | A | | 4/1971 | Eisler | 219/385 |
| 3,597,591 | A | | 8/1971 | Van Derlip | 219/528 |
| 3,614,386 | A | | 10/1971 | Hepplewhite | 219/312 |
| 3,621,566 | A | | 11/1971 | Welsh | 29/610 |
| 3,623,471 | A | | 11/1971 | Bogue et al. | 126/263.01 |
| 3,648,659 | A | | 3/1972 | Jones | 119/1 |
| 3,657,516 | A | | 4/1972 | Fujihara | 219/345 |
| 3,657,517 | A | | 4/1972 | Hoyt | 219/535 |
| D224,406 | S | | 7/1972 | Heck | D26/1 |
| 3,678,248 | A | | 7/1972 | Ticault et al. | 219/525 |
| 3,683,361 | A | | 8/1972 | Salzwedel | 338/322 |
| 3,686,472 | A | | 8/1972 | Harris | 219/213 |
| 3,686,477 | A | | 8/1972 | Dills et al. | 219/462 |
| 3,707,618 | A | | 12/1972 | Zeitlin et al. | 219/336 |
| 3,725,645 | A | | 4/1973 | Shevlin | 219/521 |
| 3,749,883 | A | | 7/1973 | Vodvarka et al. | 219/463 |
| 3,763,300 | A | * | 10/1973 | Spanjer | 264/272.11 |
| 3,774,299 | A | | 11/1973 | Sato et al. | 29/611 |
| 3,781,526 | A | | 12/1973 | Damron | 219/538 |
| 3,808,403 | A | | 4/1974 | Kanaya et al. | 219/528 |
| 3,831,129 | A | | 8/1974 | Frey | 339/19 |
| 3,859,504 | A | | 1/1975 | Motokawa et al. | 219/345 |
| 3,860,787 | A | | 1/1975 | Strobach | 219/336 |
| 3,878,362 | A | | 4/1975 | Stinger | 219/528 |
| 3,888,811 | A | | 6/1975 | Breitner | 219/203 |
| 3,900,654 | A | | 8/1975 | Stinger | 428/214 |
| 3,908,749 | A | | 9/1975 | Williams | 165/2 |
| 3,927,300 | A | | 12/1975 | Wada et al. | 219/381 |
| 3,933,550 | A | | 1/1976 | Erwin | 156/85 |
| 3,943,328 | A | | 3/1976 | Cunningham | 219/335 |
| 3,952,182 | A | | 4/1976 | Flanders | 219/309 |
| 3,968,348 | A | | 7/1976 | Stanfield | 219/535 |
| 3,974,358 | A | | 8/1976 | Goltsos | 219/387 |
| 3,976,855 | A | | 8/1976 | Altmann et al. | 219/532 |
| 3,985,928 | A | | 10/1976 | Watanabe et al. | 428/273 |
| 3,987,275 | A | | 10/1976 | Hurko | 219/461 |
| 4,021,642 | A | | 5/1977 | Fields, Jr. | 219/391 |
| 4,038,519 | A | | 7/1977 | Foucras | 219/301 |
| 4,038,628 | A | | 7/1977 | Salemi | 338/316 |
| 4,046,989 | A | | 9/1977 | Parise et al. | 219/437 |
| 4,058,702 | A | | 11/1977 | Jerles | 219/321 |
| 4,060,710 | A | | 11/1977 | Reuter et al. | 219/548 |
| 4,068,115 | A | | 1/1978 | Mack et al. | 219/386 |
| 4,083,355 | A | | 4/1978 | Schwank | 126/39 J |
| 4,094,297 | A | | 6/1978 | Ballentine | 126/39 J |
| 4,102,256 | A | | 7/1978 | John et al. | 99/372 |
| 4,112,410 | A | | 9/1978 | Wrob et al. | 338/243 |
| 4,117,311 | A | | 9/1978 | Sturm | 219/544 |
| 4,119,834 | A | | 10/1978 | Losch | 392/418 |
| 4,152,578 | A | | 5/1979 | Jacobs | 219/336 |
| 4,158,078 | A | | 6/1979 | Egger et al. | 428/102 |
| 4,176,274 | A | | 11/1979 | Lippera | 219/522 |
| 4,186,294 | A | | 1/1980 | Bender | 219/527 |
| 4,193,181 | A | * | 3/1980 | Boulanger et al. | 264/249 |
| 4,201,184 | A | | 5/1980 | Scheidler et al. | 126/39 J |
| 4,217,483 | A | | 8/1980 | Vogel et al. | 219/541 |
| 4,224,505 | A | | 9/1980 | Sturm | 219/544 |
| 4,233,495 | A | | 11/1980 | Scoville et al. | 219/386 |
| 4,245,149 | A | | 1/1981 | Fairlie | 219/528 |
| 4,250,397 | A | | 2/1981 | Gray et al. | 219/345 |
| 4,272,673 | A | | 6/1981 | Semanaz et al. | 219/544 |
| 4,294,643 | A | | 10/1981 | Tadewald | 156/293 |
| 4,296,311 | A | | 10/1981 | Hagglund et al. | 219/464 |
| 4,304,987 | A | | 12/1981 | van Konynenburg | 219/553 |
| 4,313,053 | A | | 1/1982 | Sturm | 219/544 |
| 4,313,777 | A | | 2/1982 | Buckley et al. | 156/272 |
| 4,321,296 | A | | 3/1982 | Rougier | 219/203 |
| 4,326,121 | A | | 4/1982 | Welsby et al. | 219/523 |
| 4,334,146 | A | | 6/1982 | Sturm | 219/492 |
| 4,337,182 | A | | 6/1982 | Needham | 524/609 |
| 4,346,277 | A | | 8/1982 | Wojtecki et al. | 219/528 |
| 4,346,287 | A | | 8/1982 | Desloge | 219/541 |
| 4,349,219 | A | | 9/1982 | Sturm | 285/21 |
| 4,354,096 | A | | 10/1982 | Dumas | 219/523 |
| 4,358,552 | A | | 11/1982 | Shinohara et al. | 523/443 |
| 4,364,308 | A | | 12/1982 | John et al. | 99/351 |
| 4,375,591 | A | | 3/1983 | Sturm | 219/544 |
| 4,387,293 | A | | 6/1983 | Grice et al. | 219/529 |
| 4,388,607 | A | | 6/1983 | Toy et al. | 338/22 |
| 4,390,551 | A | | 6/1983 | Swartley et al. | 426/107 |
| 4,419,567 | A | | 12/1983 | Murphy et al. | 219/336 |
| 4,429,215 | A | | 1/1984 | Sakai et al. | 219/528 |
| 4,436,988 | A | | 3/1984 | Blumenkranz | 219/544 |
| 4,482,239 | A | | 11/1984 | Hosono et al. | 355/3 |
| 4,493,985 | A | | 1/1985 | Keller | 219/535 |
| 4,501,951 | A | | 2/1985 | Benin et al. | 219/243 |
| 4,530,521 | A | | 7/1985 | Nyffeler et al. | 285/21 |
| 4,532,414 | A | | 7/1985 | Shah et al. | 219/308 |
| 4,534,886 | A | | 8/1985 | Kraus et al. | 252/502 |
| 4,540,479 | A | | 9/1985 | Sakurai et al. | 204/427 |
| 4,606,787 | A | | 8/1986 | Pelligrino | 156/632 |
| 4,615,987 | A | | 10/1986 | Chyunt et al. | 501/8 |
| 4,617,456 | A | | 10/1986 | Richards | 392/503 |
| 4,633,063 | A | | 12/1986 | Willis | 219/243 |
| 4,640,226 | A | | 2/1987 | Liff | 119/1 |
| 4,641,012 | A | | 2/1987 | Roberts | 219/331 |
| 4,658,121 | A | | 4/1987 | Horsma et al. | 219/553 |
| 4,687,905 | A | | 8/1987 | Cunningham et al. | 219/336 |
| 4,703,150 | A | | 10/1987 | Kunnecke et al. | 219/535 |

| | | | | | |
|---|---|---|---|---|---|
| 4,707,590 | A | | 11/1987 | Lefebvre | 219/523 |
| 4,725,395 | A | * | 2/1988 | Gasparaitis et al. | 264/272.15 |
| 4,725,717 | A | | 2/1988 | Harrison | 219/528 |
| 4,730,148 | A | | 3/1988 | Nakata | 315/397 |
| 4,751,528 | A | | 6/1988 | Spehrley, Jr. et al. | 346/140 |
| 4,756,781 | A | | 7/1988 | Etheridge | 156/85 |
| 4,762,980 | A | | 8/1988 | Insley | 219/307 |
| 4,797,537 | A | | 1/1989 | Berthelius et al. | 219/528 |
| 4,845,343 | A | | 7/1989 | Aune et al. | 219/545 |
| 4,860,434 | A | | 8/1989 | Louison et al. | 29/611 |
| 4,865,014 | A | | 9/1989 | Nelson | 126/361 |
| 4,865,674 | A | | 9/1989 | Durkin | 156/158 |
| 4,866,252 | A | | 9/1989 | Van Loo et al. | 219/535 |
| 4,904,845 | A | | 2/1990 | Wonka | 219/280 |
| 4,911,978 | A | | 3/1990 | Tsubone et al. | 428/317.9 |
| 4,913,666 | A | | 4/1990 | Murphy | 439/709 |
| 4,927,999 | A | | 5/1990 | Hanselka | 219/535 |
| 4,948,948 | A | | 8/1990 | Lesage | 219/329 |
| 4,956,138 | A | | 9/1990 | Barfield | 264/129 |
| 4,970,528 | A | | 11/1990 | Beaufort et al. | 346/25 |
| 4,972,197 | A | | 11/1990 | McCauley et al. | 343/704 |
| 4,982,064 | A | | 1/1991 | Hartman et al. | 219/727 |
| 4,983,814 | A | | 1/1991 | Ohgushi et al. | 219/545 |
| 4,986,870 | A | | 1/1991 | Frohlich | 156/382 |
| 4,993,401 | A | | 2/1991 | Diekmann et al. | 126/39 |
| 5,003,693 | A | | 4/1991 | Atkinson et al. | 29/849 |
| 5,013,890 | A | | 5/1991 | Gamble | 392/497 |
| 5,021,805 | A | | 6/1991 | Imaizumi et al. | 346/76 R |
| 5,023,433 | A | | 6/1991 | Gordon | 219/548 |
| 5,038,458 | A | | 8/1991 | Wagoner et al. | 29/593 |
| 5,041,846 | A | | 8/1991 | Vincent et al. | 346/25 |
| 5,051,275 | A | | 9/1991 | Wong | 427/58 |
| 5,066,852 | A | | 11/1991 | Willbanks | 219/544 |
| 5,068,518 | A | | 11/1991 | Yasuda | 219/549 |
| 5,073,320 | A | | 12/1991 | Sterzel | 264/101 |
| 5,094,179 | A | | 3/1992 | Badillo | 112/114 |
| 5,111,025 | A | | 5/1992 | Barma et al. | 29/217 |
| 5,113,480 | A | | 5/1992 | Murphy et al. | 392/501 |
| 5,129,033 | A | | 7/1992 | Ferrara et al. | 392/447 |
| 5,136,143 | A | | 8/1992 | Kutner et al. | 219/544 |
| 5,155,800 | A | | 10/1992 | Rezabek et al. | 382/503 |
| 5,159,659 | A | | 10/1992 | Cameron | 329/503 |
| 5,162,634 | A | | 11/1992 | Kusaka | 219/216 |
| 5,184,969 | A | | 2/1993 | Sharpless et al. | 445/24 |
| 5,195,976 | A | | 3/1993 | Swenson | 604/113 |
| 5,208,080 | A | | 5/1993 | Gajewski et al. | 418/1 |
| 5,221,419 | A | | 6/1993 | Beckett | 156/630 |
| 5,221,810 | A | | 6/1993 | Spahn | 102/475 |
| 5,237,155 | A | | 8/1993 | Hill | 219/544 |
| 5,252,157 | A | | 10/1993 | Inhofe, Jr. | 156/158 |
| 5,255,595 | A | | 10/1993 | Higgins | 99/378 |
| 5,255,942 | A | | 10/1993 | Kenworthy | 285/21 |
| 5,287,123 | A | | 2/1994 | Medin et al. | 346/140 R |
| 5,293,446 | A | | 3/1994 | Owens et al. | 392/449 |
| 5,300,760 | A | | 4/1994 | Batliwalla et al. | 219/549 |
| 5,302,807 | A | | 4/1994 | Zhao | 219/211 |
| 5,304,778 | A | | 4/1994 | Dasgupta et al. | 219/270 |
| 5,305,419 | A | | 4/1994 | Cameron | 392/503 |
| 5,313,034 | A | | 5/1994 | Grimm | 156/274.2 |
| 5,338,602 | A | * | 8/1994 | Sheer et al. | 264/272.11 |
| 5,371,830 | A | | 12/1994 | Wachenheim | 392/503 |
| 5,389,184 | A | | 2/1995 | Jacaruso et al. | 156/378 |
| 5,397,873 | A | | 3/1995 | Stoops et al. | 219/450 |
| 5,406,316 | A | | 4/1995 | Schwiebert et al. | 347/18 |
| 5,406,321 | A | | 4/1995 | Schwiebert et al. | 347/102 |
| 5,408,070 | A | | 4/1995 | Hyllberg | 392/503 |
| 5,453,599 | A | | 9/1995 | Hall, Jr. | 219/544 |
| 5,461,408 | A | | 10/1995 | Giles et al. | 347/102 |
| 5,476,562 | A | | 12/1995 | Inhofe, Jr. | 156/156 |
| 5,477,033 | A | | 12/1995 | Bergholtz | 219/549 |
| 5,497,883 | A | | 3/1996 | Monetti | 206/545 |
| 5,500,667 | A | | 3/1996 | Schwiebert et al. | 347/102 |
| 5,520,102 | A | | 5/1996 | Monetti | 099/483 |
| 5,521,357 | A | | 5/1996 | Lock et al. | 219/543 |
| 5,571,435 | A | | 11/1996 | Needham | 219/544 |
| 5,572,290 | A | | 11/1996 | Ueno et al. | 399/329 |
| 5,581,289 | A | | 12/1996 | Firl et al. | 347/104 |
| 5,582,754 | A | | 12/1996 | Smith et al. | 219/438 |
| 5,586,214 | A | | 12/1996 | Eckman | 392/503 |
| 5,618,065 | A | | 4/1997 | Akiyama | 285/21.2 |
| 5,619,240 | A | | 4/1997 | Pong et al. | 347/103 |
| 5,625,398 | A | | 4/1997 | Milkovitz et al. | 347/104 |
| 5,633,668 | A | | 5/1997 | Schwiebert et al. | 347/102 |
| 5,691,756 | A | | 11/1997 | Rise et al. | 347/102 |
| 5,697,143 | A | | 12/1997 | Barfield | 29/611 |
| 5,703,998 | A | | 12/1997 | Eckman | 392/340 |
| 5,708,251 | A | | 1/1998 | Naveh | 219/121.66 |
| 5,714,738 | A | | 2/1998 | Hauschulz et al. | 219/535 |
| 5,779,870 | A | | 7/1998 | Seip | 205/77 |
| 5,780,817 | A | | 7/1998 | Eckman et al. | 219/458 |
| 5,780,820 | A | | 7/1998 | Komyoji et al. | 219/543 |
| 5,781,412 | A | | 7/1998 | De Sorgo | 361/704 |
| 5,806,177 | A | | 9/1998 | Hosomi et al. | 29/846 |
| 5,807,332 | A | | 9/1998 | Augustine et al. | 604/113 |
| 5,811,769 | A | | 9/1998 | Schiffmann et al. | 219/762 |
| 5,822,675 | A | | 10/1998 | Paquet et al. | 428/561 |
| 5,824,996 | A | | 10/1998 | Kochman et al. | 219/529 |
| 4,784,054 | A | | 11/1998 | Karos et al. | 99/483 |
| 5,829,171 | A | | 11/1998 | Weber et al. | 36/93 |
| 5,835,679 | A | | 11/1998 | Eckman et al. | |
| 5,856,650 | A | | 1/1999 | Rise et al. | 219/216 |
| 5,883,364 | A | | 3/1999 | Frei et al. | 219/535 |
| 5,902,518 | A | | 5/1999 | Khazai et al. | 252/511 |
| 6,089,406 | A | | 6/1999 | Feldner | 222/103 |
| 5,930,459 | A | | 7/1999 | Eckman | 392/503 |
| 5,940,895 | A | | 8/1999 | Wilson et al. | 4/237 |
| 5,947,012 | A | | 9/1999 | Ewald et al. | 99/374 |
| 5,954,977 | A | | 9/1999 | Miller et al. | 219/201 |
| 5,961,869 | A | | 10/1999 | Irgens | 219/549 |
| 6,056,157 | A | | 5/2000 | Gehl et al. | 222/94 |
| 6,137,098 | A | | 10/2000 | Moseley et al. | 219/727 |
| 6,147,332 | A | | 11/2000 | Holmberg et al. | 219/526 |
| 6,147,335 | A | | 11/2000 | Von Arx et al. | 219/544 |
| 6,150,635 | A | | 11/2000 | Hannon et al. | 219/386 |
| 6,162,385 | A | | 12/2000 | Grosse-Puppendahl et al. | 254/250 |

FOREIGN PATENT DOCUMENTS

| | | |
|---|---|---|
| GB | 1070849 | 6/1967 |
| GB | 1325084 | 8/1973 |
| GB | 1498792 | 1/1978 |
| GB | 2244898 | 12/1999 |
| JP | 53-134245 | 11/1978 |
| JP | 3-129694 | 6/1991 |
| JP | 07 211438 A | 11/1995 |

OTHER PUBLICATIONS

"At HEI, Engineering is our Middle Name", Heaters Engineering, Inc., Mar. 2, 1995.

"Flexibility and cost Savings with Rope Elements", Heating Engineers, Inc. Aug. 1998.

Desloge Engineering Col, Letter to Lou Steinhauser dated Feb. 19, 1997.

Immersion Heaters Oil and Water, p. 11 (19_)v.

Special Purpose Flange Heaters, p. 58 (19_).

Lakewood Trade Literature entitled "Oil–Filled Radiator Heater" (19_).

Encon Drawing Part Nos. 02–06–480 & 02–06–481 (19_).

Encon Drawing No. 500765 (Jun. 10, 1987).

Vulcan Electric Company Trade Literature entitled "Bushing Immersion Heaters", 1983.
Trade Literature "Euro–Burner Solid Disc Converson Burners" Energy Convertors, Inc., Dallas, PA 1991.
"Polymers," *Guide to Selecting Engineering Materials*, a special issue of Advanced Materials & Presses, Metals Park, OH, ASM International, 1990, pp. 32–33.
Machine Design, "Basics of Design Engineering" Jun. 1991, pp. 429–432, 551, 882–884.
Machine Design, "Basics of Design Engineering", Jun. 1994, pp 624–631.
Machine Design, May 18, 2000, 3 pages.
Carvill, Wm. T., "Prepreg Resins", Enginerred Materials Handbook, vol. 1, Composites pp. 139–142.
Thermoplastic Polyimide (TPI) Features, RTP Company's 4200 series compounds (4 pages).
World Headquarters, RTP Co, RTP 1300 Series Polyphenylene Sulfide Compounds, 1 page.
World Headquarters, RTP Co, RTP 2100 Series Polyetherimide Compounds, 1 page.
World Headquarters, RTP Co, RTP 3400 Series Liquid Crystal Polymer Compounds, 1 page.
World Headquarters, RTP Co, RTP 4200 Series Thermoplastic Polyimide Compounds, 1 page.
A.M. Wittenberg, "Pin Shorting Contact," Western Electric Technical Digest No. 60, Oct. 1980, p. 25.
International Search Report, Aug. 8, 2000.

* cited by examiner

METHOD OF MAKING AN IMPROVED POLYMERIC IMMERSION HEATING ELEMENT WITH SKELETAL SUPPORT AND OPTIONAL HEAT TRANSFER FINS

CROSS REFERENCE TO RELATED APPLICATIONS

This application is a divisional application of U.S. patent application Ser. No. 08/755,836 filed Nov. 26, 1996, now U.S. Pat. No. 5,835,679, which, in turn, is a continuation-in-part of U.S. patent application Ser. No. 08/365,920 filed Dec. 29, 1994, now U.S. Pat. No. 5,586,214 and entitled "Immersion Heating Element With Electric Resistance Heating Material and Polymeric Layer Disposed Thereon."

FIELD OF THE INVENTION

This invention relates to electric resistance heating elements, and more particularly, to polymer-based resistance heating elements for heating gases and liquids.

BACKGROUND OF THE INVENTION

Electric resistance heating elements used in connection with water heaters have traditionally been made of metal and ceramic components. A typical construction includes a pair of terminal pins brazed to the ends of an Ni—Cr coil, which is then disposed axially through a U-shaped tubular metal sheath. The resistance coil is insulated from the metal sheath by a powdered ceramic material, usually magnesium oxide. While such conventional heating elements have been the workhorse for the water heater industry for decades, there have been a number of widely-recognized deficiencies. For example, galvanic currents occurring between the metal sheath and any exposed metal surfaces in the tank can create corrosion of the various anodic metal components of the system. The metal sheath of the heating element, which is typically copper or copper alloy, also attracts lime deposits from the water, which can lead to premature failure of the heating element. Additionally, the use of brass fittings and copper tubing has become increasingly more expensive as the price of copper has increased over the years.

As an alternative to metal elements, at least one plastic sheath electric heating element has been proposed in Cunningham, U.S. Pat. No. 3,943,328. In the disclosed device, conventional resistance wire and powdered magnesium oxide are used in conjunction with a plastic sheath. Since this plastic sheath is non-conductive, there is no galvanic cell created with the other metal parts of the heating unit in contact with the water in the tank, and there is also no lime buildup. Unfortunately, for various reasons, these prior art, plastic-sheath heating elements were not capable of attaining high wattage ratings over a normal useful service life, and concomitantly, were not widely accepted.

SUMMARY OF THE INVENTION

This invention provides electrical resistance heating elements capable of being disposed through a wall of a tank, such as a water heater storage tank, for use in connection with heating a fluid medium. The element includes a skeletal support frame having a first supporting surface thereon. Wound onto this supporting surface is a resistance wire which is capable of providing resistance heating to the fluid. The resistance wire is hermetically encapsulated and electrically insulated within a thermally-conductive polymeric coating.

This invention greatly facilitates molding operations by providing a thin skeletal structure for supporting the resistance heating wire. This structure includes a plurality of openings or apertures for permitting better flow of molten polymeric material. The open support provides larger mold cross-sections that are easier to fill. During injection molding, for example, molten polymer can be directed almost entirely around the resistance heating wire to greatly reduce the incidence of bubbles along the interface of the skeletal support frame and the polymeric overmolded coating. Such bubbles have been known to cause hot spots during the operation of the element in water. Additionally, the thin skeletal support frames of this invention reduce the potential for delamination of molded components and separation of the resistance heating wire from the polymer coating. The methods provided by this invention greatly improve coverage and help to minimize mold openings by requiring lower pressures.

In a further embodiment of this invention, a method of manufacturing an electrical resistance heating element is provided. This manufacturing method includes providing a skeletal support frame having a support surface and winding a resistance heating wire onto the support surface. Finally, a thermally-conductive polymer is molded over the resistance heating wire to electrically insulate and hermetically encapsulate the wire. This method can be varied to include injection molding the support frame and thermally-conductive polymer, and a common resin can be used for both of these components to provide a more uniform thermal conductivity to the resulting element.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

This invention provides electrical resistance heating elements and water heaters containing these elements. These devices are useful in minimizing galvanic corrosion within water and oil heaters, as well as lime buildup and problems of shortened element life. As used herein, the terms "fluid" and "fluid medium" apply to both liquids and gases.

Figure 1:
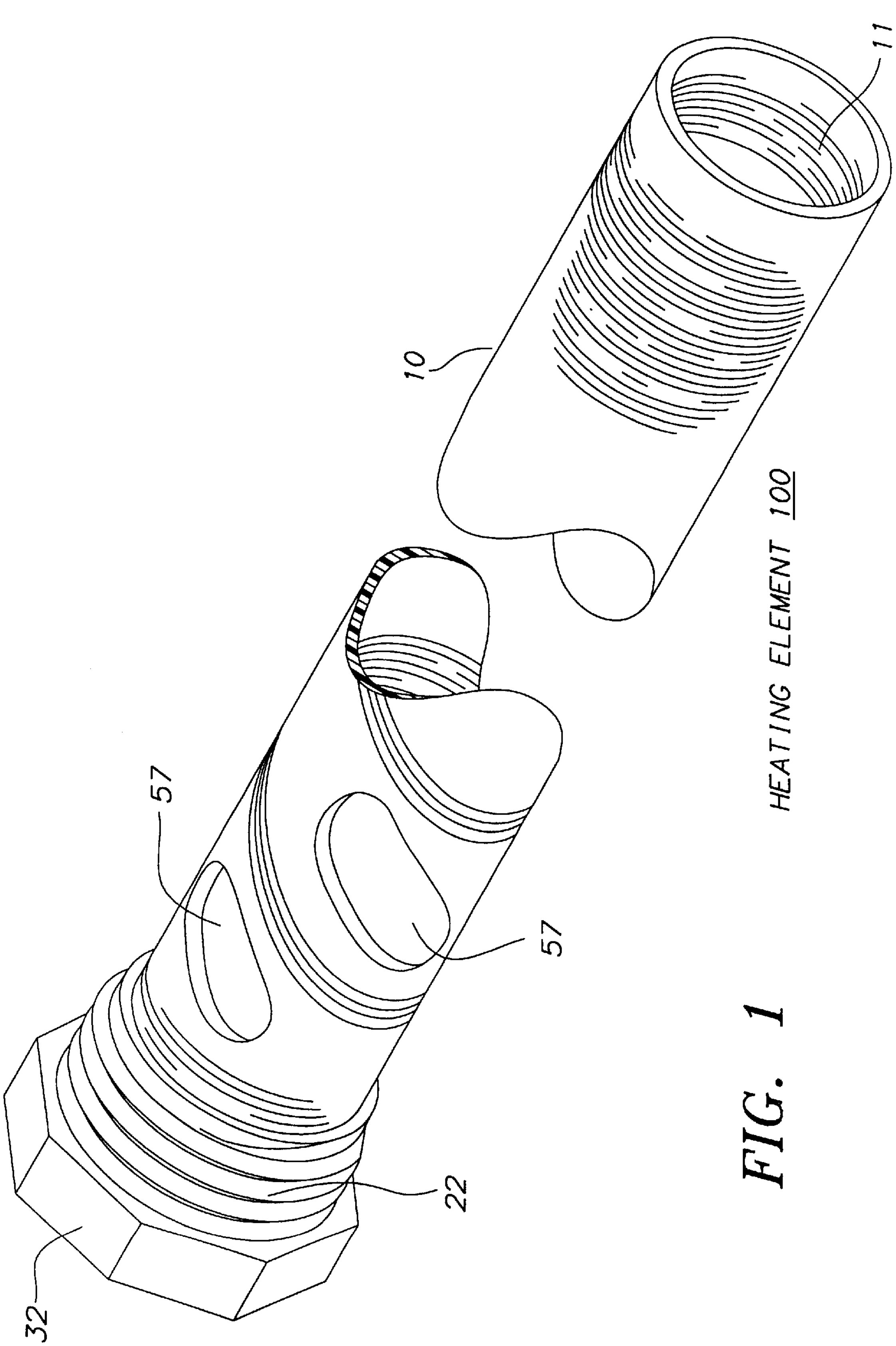
FIG. 1: is a perspective view of a preferred polymeric fluid heater of this invention.
Figure 2:
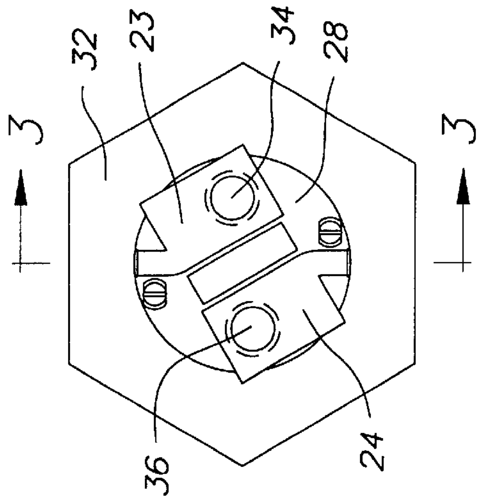
FIG. 2: is a left side, plan view of the polymeric fluid heater of FIG. 1.
Figure 3:
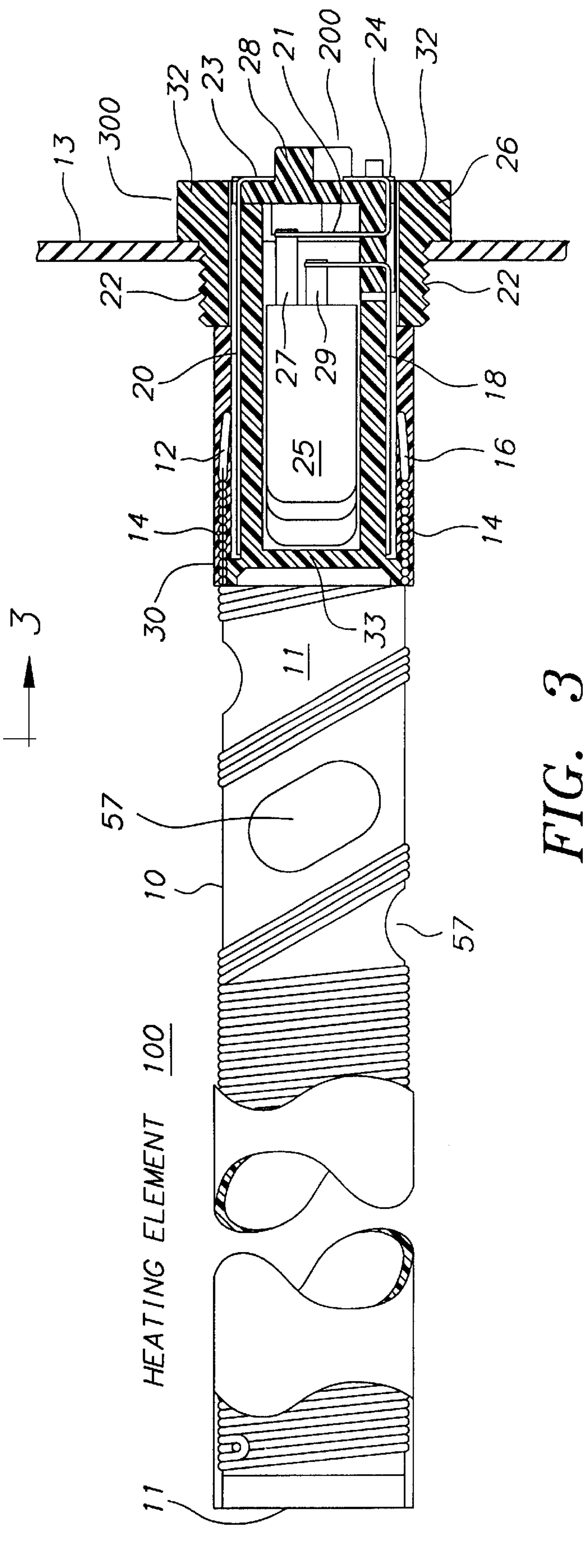
FIG. 3: is a front planar view, including partial cross-sectional and peel-away views, of the polymeric fluid heater of FIG. 1.

With reference to the drawings, and particularly with reference to FIGS. 1–3 thereof, there is shown a preferred polymeric fluid heater 100 of this invention. The polymeric fluid heater 100 contains an electrically conductive, resistance heating material. This resistance heating material can be in the form of a wire, mesh, ribbon, or serpentine shape, for example. In the preferred heater 100, a coil 14 having a pair of free ends joined to a pair of terminal end portions 12 and 16 is provided for generating resistance heating. Coil 14 is hermetically and electrically insulated from fluid with an integral layer of a high temperature polymeric material. In other words, the active resistance heating material is protected from shorting out in the fluid by the polymeric coating. The resistance material of this invention is of sufficient surface area, length or cross-sectional thickness to heat water to a temperature of at least about 120° F. without melting the polymeric layer. As will be evident from the below discussion, this can be accomplished through carefully selecting the proper materials and their dimensions.

Figure 4:
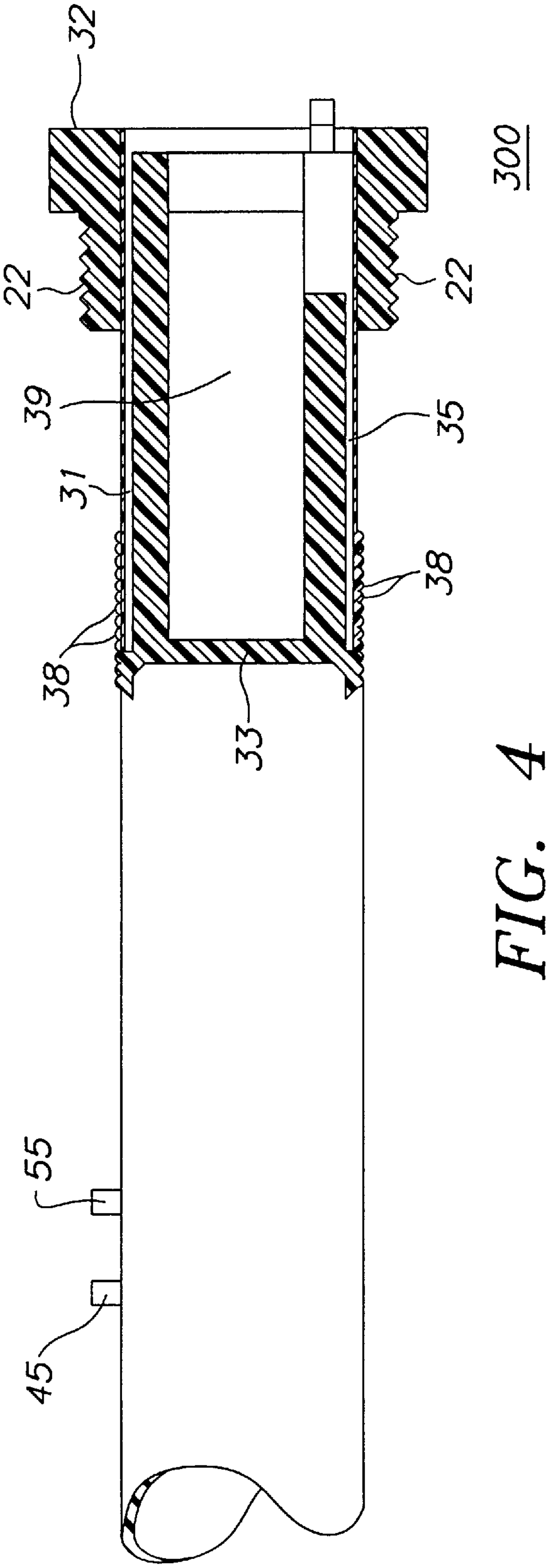
FIG. 4: is a front planar, cross-sectional view of a preferred inner mold portion of the polymeric fluid heater of FIG. 1.
Figure 5:
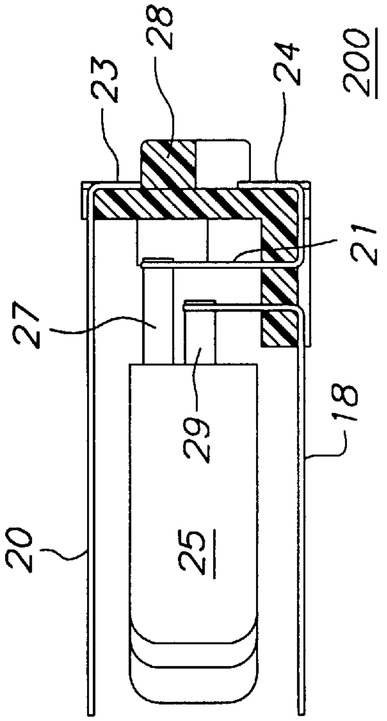
FIG. 5: is a front planar, partial cross-sectional view of a preferred termination assembly for the polymeric fluid heater of FIG. 1.

With reference to FIG. 3 in particular, the preferred polymeric fluid heater 100 generally comprises three integral parts: a termination assembly 200, shown in FIG. 5, a inner mold 300, shown in FIG. 4, and a their final assembly into the polymeric fluid heater 100 will now be further explained.

The preferred inner mold 300, shown in FIG. 4, is a single-piece injection molded component made from a high temperature polymer. The inner mold 300 desirably includes a flange 32 at its outermost end. Adjacent to the flange 32 is a collar portion having a plurality of threads 22. The threads 22 are designed to fit within the inner diameter of a mounting aperture through the sidewall of a storage tank, for example in a water heater tank 13. An O-ring (not shown) can be employed on the inside surface of the flange 32 to provide a surer water-tight seal. The preferred inner mold 300 also includes a thermistor cavity 39 located within its preferred circular cross-section. The thermistor cavity 39 can include an end wall 33 for separating the thermistor 25 from fluid. The thermistor cavity 39 is preferably open through the flange 32 so as to provide easy insertion of the termination assembly 200. The preferred inner mold 300 also contains at least a pair of conductor cavities 31 and 35 located between the thermistor cavity and the outside wall of the inner mold for receiving the conductor bar 18 and terminal conductor 20 of the termination assembly 200. The inner mold 300 contains a series of radial alignment grooves 38 disposed around its outside circumference. These grooves can be threads or unconnected trenches, etc., and should be spaced sufficiently to provide a seat for electrically separating the helices of the preferred coil 14.

The preferred inner mold 300 can be fabricated using injection molding processes. The flow-through cavity 11 is preferably produced using a 12.5 inch long hydraulically activated core pull, thereby creating an element which is about 13–18 inches in length. The inner mold 300 can be filled in a metal mold using a ring gate placed opposite from the flange 32. The target wall thickness for the active element portion 10 is desirably less than 0.5 inches, and preferably less than 0.1 inches, with a target range of about 0.04–0.06 inches, which is believed to be the current lower limit for injection molding equipment. A pair of hooks or pins 45 and 55 are also molded along the active element development portion 10 between consecutive threads or trenches to provide a termination point or anchor for the helices of one or more coils. Side core pulls and an end core pull through the flange portion can be used to provide the thermistor cavity 39, flow-through cavity 11, conductor cavities 31 and 35, and flow-through apertures 57 during injection molding.

With reference to FIG. 5, the preferred termination assembly 200 will now be discussed. The termination assembly 200 comprises a polymer end cap 28 designed to accept a pair of terminal connections 23 and 24. As shown in FIG. 2, the terminal connections 23 and 24 can contain threaded holes 34 and 36 for accepting a threaded connector, such as a screw, for mounting external electrical wires. The terminal connections 23 and 24 are the end portions of terminal conductor 20 and thermistor conductor bar 21. Thermistor conductor bar 21 electrically connects terminal connection 24 with thermistor terminal 27. The other thermistor terminal 29 is connected to thermistor conductor bar 18 which is designed to fit within conductor cavity 35 along the lower portion of FIG. 4. To complete the circuit, a thermistor 25 is provided. Optionally, the thermistor 25 can be replaced with a thermostat, a solid-state TCO or merely a grounding band that is connected to an external circuit breaker, or the like. It is believed that the grounding band (not shown) could be located proximate to one of the terminal end portions 16 or 12 so as to short-out during melting of the polymer.

In the preferred environment, thermistor 25 is a snap-action thermostat/thermoprotector such as the Model W Series sold by Portage Electric. This thermoprotector has compact dimensions and is suitable for 120/240 VAC loads. It comprises a conductive bi-metallic construction with an electrically active case. End cap 28 is preferably a separate molded polymeric part.

After the termination assembly 200 and inner mold 300 are fabricated, they are preferably assembled together prior to winding the disclosed coil 14 over the alignment grooves 38 of the active element portion 10. In doing so, one must be careful to provide a completed circuit with the coil terminal end portions 12 and 16. This can be assured by brazing, soldering or spot welding the coil terminal end portions 12 and 16 to the terminal conductor 20 and thermistor conductor bar 18. It is also important to properly locate the coil 14 over the inner mold 300 prior to applying the polymer coating 30. In the preferred embodiment, the polymer coating 30 is over-extruded to form a thermoplastic polymeric bond with the inner mold 300. As with the inner mold 300, core pulls can be introduced into the mold during the molding process to keep the flow-through apertures 57 and flow-through cavity 11 open.

Figure 6:
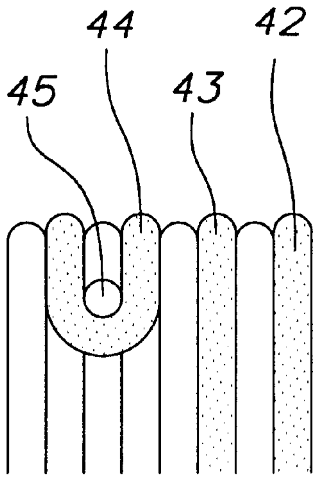
FIG. 6: is a enlarged partial front planar view of the end of a preferred coil for a polymeric fluid heater of this invention.
Figure 7:
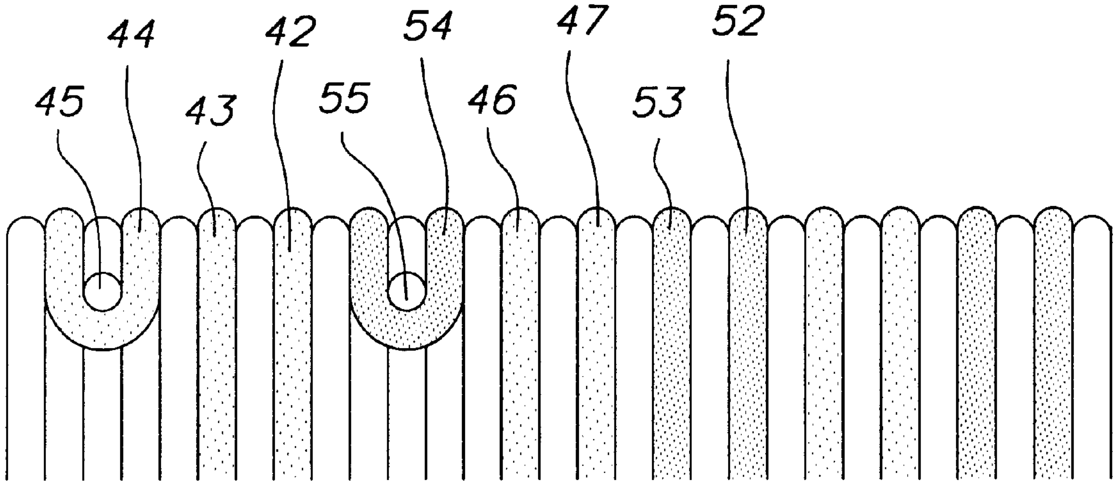
FIG. 7: is a enlarged partial front planar view of a dual coil embodiment for a polymeric fluid heater of this invention.

With respect to FIGS. 6 and 7, there are shown single and double resistance wire embodiments for the polymeric resistance heating elements of this invention. In the single wire embodiment shown in FIG. 6, the alignment grooves 38 of the inner mold 300 are used to wrap a first wire pair having helices 42 and 43 into a coil form. Since the preferred embodiment includes a folded resistance wire, the end portion of the fold or helix terminus 44 is capped by folding it around pin 45. Pin 45 ideally is part of, and injection molded along with, the inner mold 300.

Similarly, a dual resistance wire configuration can be provided. In this embodiment, the first pair of helices 42 and 43 of the first resistance wire are separated from the next consecutive pair of helices 46 and 47 in the same resistance wire by a secondary coil helix terminus 54 wrapped around a second pin 55. A second pair of helices 52 and 53 of a second resistance wire, which are electrically connected to the secondary coil helix terminus 54, are then wound around the inner mold 300 next to the helices 46 and 47 in the next adjoining pair of alignment grooves. Although the dual coil assembly shows alternating pairs of helices for each wire, it is understood that the helices can be wound in groups of two or more helices for each resistance wire, or in irregular numbers, and winding shapes as desired, so long as their conductive coils remain insulated from one another by the inner mold, or some other insulating material, such as separate plastic coatings, etc.

The plastic parts of this invention preferably include a "high temperature" polymer which will not deform significantly or melt at fluid medium temperatures of about 120–180° F. Thermoplastic polymers having a melting temperature greater than 200° F. are most desirable, although certain ceramics and thermosetting polymers could also be useful for this purpose. Preferred thermoplastic material can include: fluorocarbons, polyaryl-sulphones, polyimides, polyetheretherketones, polyphenylene sulphides, polyether sulphones, and mixtures and copolymers of these thermoplastics. Thermosetting polymers which would be acceptable for such applications include certain epoxies, phenolics, and silicones. Liquid-crystal polymers can also be employed for improving high temperature chemical processing.

In the preferred embodiment of this invention, polyphenylene sulphide ("PPS") is most desirable because of its elevated temperature service, low cost and easier processability, especially during injection molding.

The polymers of this invention can contain up to about 5–40 wt. % percent fiber reinforcement, such as graphite, glass or polyamide fiber. These polymers can be mixed with various additives for improving thermal conductivity and mold-release properties. Thermal conductivity can be improved with the addition of carbon, graphite and metal powder or flakes. It is important however that such additives are not used in excess, since an overabundance of any conductive material may impair the insulation and corrosion-resistance effects of the preferred polymer coatings. Any of the polymeric elements of this invention can be made with any combination of these materials, or selective ones of these polymers can be used with or without additives for various parts of this invention depending on the end-use for the element.

The resistance material used to conduct electrical current and generate heat in the fluid heaters of this invention preferably contains a resistance metal which is electrically conductive, and heat resistant. A popular metal is Ni—Cr alloy although certain copper, steel and stainless-steel alloys could be suitable. It is further envisioned that conductive polymers, containing graphite, carbon or metal powders or fibers, for example, used as a substitute for metallic resistance material, so long as they are capable of generating sufficient resistance heating to heat fluids, such as water. The remaining electrical conductors of the preferred polymeric fluid heater 100 can also be manufactured using these conductive materials.

Figure 8:
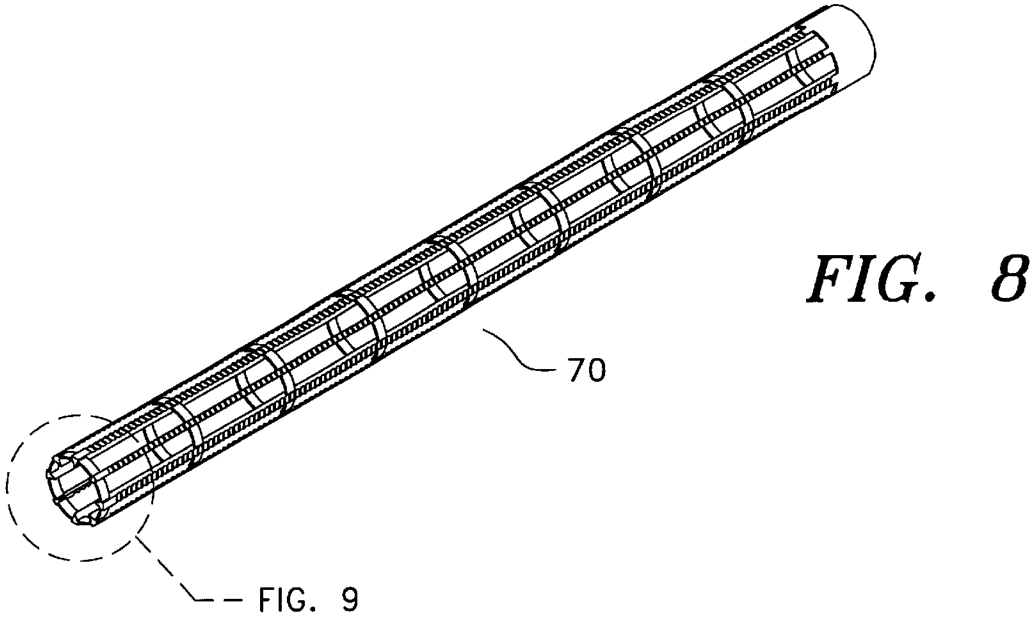
FIG. 8: is a front perspective view of a preferred skeletal support frame of the heating element of this invention.
Figure 9:
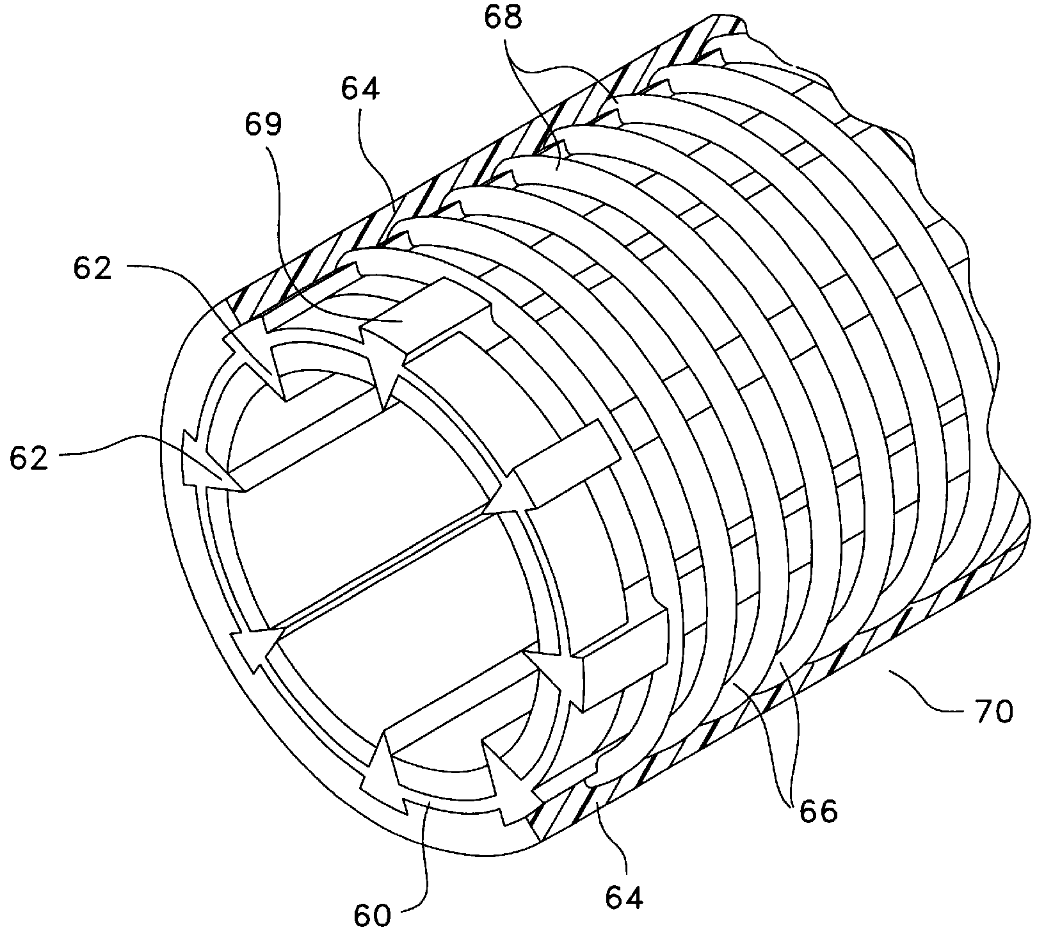
FIG. 9: is an enlarged partial view of the preferred skeletal support frame of FIG. 8, illustrating a deposited thermally-conductive polymeric coating.

As an alternative to the preferred inner mold 300 of this invention, a skeletal support frame 70, shown in FIGS. 8 and 9 has been demonstrated to provide additional benefits. When a solid inner mold 300, such as a tube, was employed in injection molding operations, improper filling of the mold sometimes occurred due to heater designs requiring thin wall thicknesses of as low as 0.025 inches, and exceptional lengths of up to 14 inches. The thermally-conductive polymer also presented a problem since it desirably included additives, such as glass fiber and ceramic powder, aluminum oxide ($Al_2O_3$) and magnesium oxide (MgO), which caused the molten polymer to be extremely viscous. As a result, excessive amounts of pressure were required to properly fill the mold, and at times, such pressure caused the mold to open.

In order to minimize the incidence of such problems, this invention contemplates using a skeletal support frame 70 having a plurality of openings and a support surface for retaining resistance heating wire 66. In a preferred embodiment, the skeletal support frame 70 includes a tubular member having about 6–8 spaced longitudinal splines 69 running the entire length of the frame 70. The splines 69 are held together by a series of ring supports 60 longitudinally spaced over the length of the tube-like member. These ring supports 60 are preferably less than about 0.05 inches thick, and more preferably about 0.025–0.030 inches thick. The splines 69 are preferably about 0.125 inches wide at the top and desirably are tapered to a pointed heat transfer fin 62. These fins 62 should extend at least about 0.125 inches beyond the inner diameter of the final element after the polymeric coating 64 has been applied, and, as much as 0.250 inches, to effect maximum heat conduction into fluids, such as water.

The outer radial surface of the splines 69 preferably include grooves which can accommodate a double helical alignment of the preferred resistance heating wire 66.

Although this invention describes the heat transfer fins 62 as being part of the skeletal support frame 70, such fins 62 can be fashioned as part of the ring supports 60 or the overmolded polymeric coating 64, or from a plurality of these surfaces. Similarly, the heat transfer fins 62 can be provided on the outside of the splines 69 so as to pierce beyond the polymeric coating 64. Additionally, this invention envisions providing a plurality of irregular or geometrically shaped bumps or depressions along the inner or outer surface of the provided heating elements. Such heat transfer surfaces are known to facilitate the removal of heat from surfaces into liquids. They can be provided in a number of ways, including injection molding them into the surface of the polymeric coating 64 or fins 62, etching, sandblasting, or mechanically working the exterior surfaces of the heating elements of this invention.

In a preferred embodiment of this invention, the skeletal support frame 70 includes a thermoplastic resin, which can be one of the "high temperature" polymers described herein, such as polyphenylene sulphide ("PPS"), with a small amount of glass fibers for structural support, and optionally ceramic powder, such as $Al_2O_3$ or MgO, for improving thermal conductivity. Alternatively, the skeletal support frame can be a fused ceramic member, including one or more of alumina silicate, $Al_2O_3$, MgO, graphite, $ZrO_2$, $Si_3N_4$, $Y_2O_3$, SiC, $SiO_2$, etc., or a thermoplastic or thermosetting polymer which is different than the "high temperature" polymers suggested to be used with the coating 30. If a thermoplastic is used for the skeletal support frame 70 it should have a heat deflection temperature greater than the temperature of the molten polymer used to mold the coating 30.

The skeletal support frame 70 is placed in a wire winding machine and the preferred resistance heating wire 66 is folded and wound in a dual helical configuration around the skeletal support frame 70 in the preferred support surface, i.e. spaced grooves 68. The fully wound skeletal support frame 70 is thereafter placed in the injection mold and then is overmolded with one of the preferred polymeric resin formulas of this invention. In one preferred embodiment, only a small portion of the heat transfer fin 62 remains exposed to contact fluid, the remainder of the skeletal support frame 70 is covered with the molded resin on both the inside and outside, if it is tubular in shape. This exposed portion is preferably less than about 10 percent of the surface area of the skeletal support frame 70.

The open cross-sectional areas, constituting the plurality of openings of the skeletal support frame 70, permit easier filling and greater coverage of the resistance heating wire 66 by the molded resin, while minimizing the incidence of bubbles and hot spots. In preferred embodiments, the open areas should comprise at least about 10 percent and desirably greater than 20 percent of the entire tubular surface area of the skeletal support frame 70, so that molten polymer can more readily flow around the support frame 70 and resistance heating wire 66.

Figure 11:
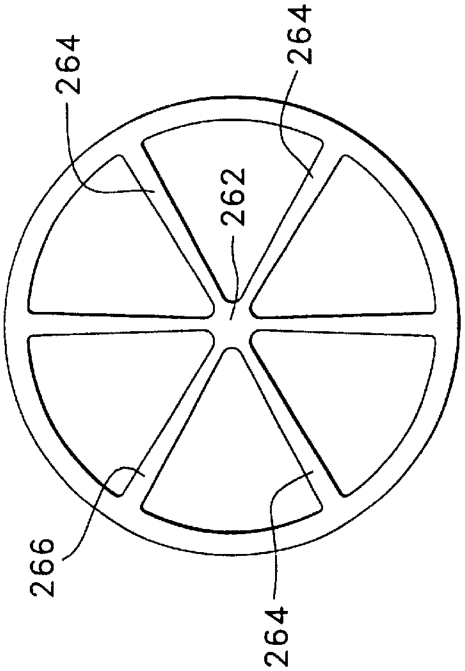
FIG. 11: is a side plan view of the skeletal support frame of FIG. 10.
Figure 10:
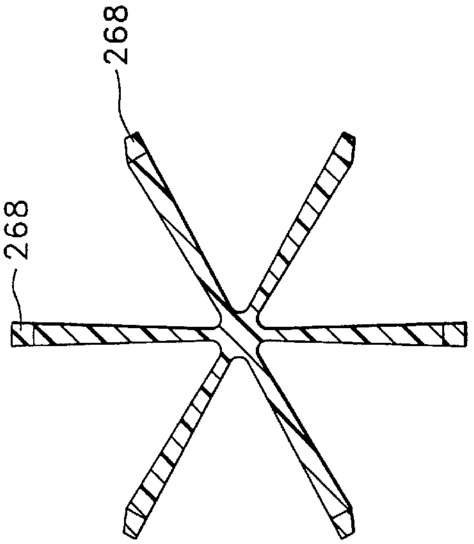
FIG. 10: is an enlarged cross-sectional view of an alternative skeletal support frame.
Figure 12:
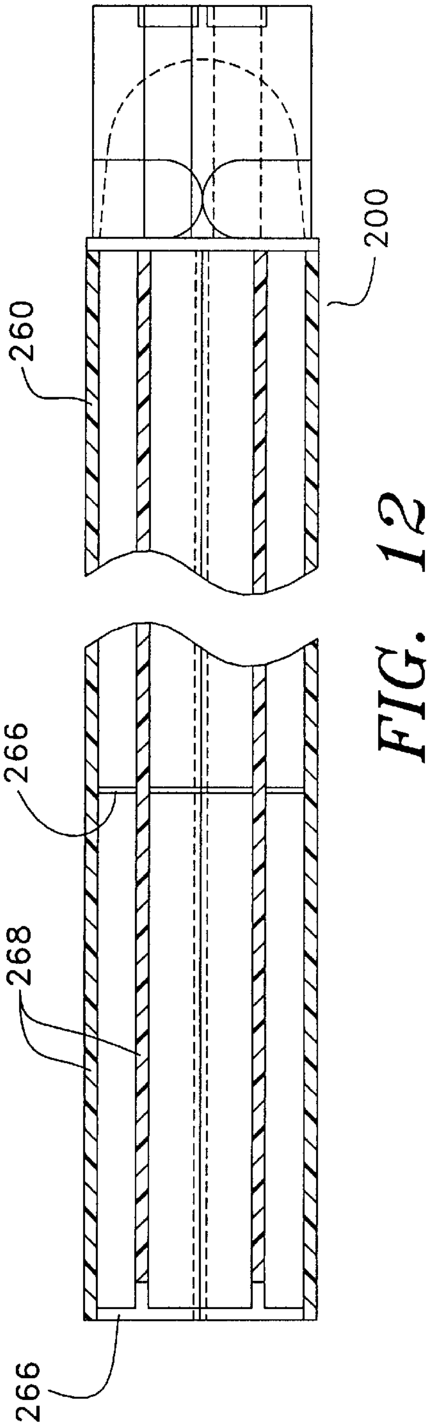
FIG. 12: is a front plan view of the full skeletal support frame of FIG. 10.

An alternative skeletal support frame 200 is illustrated in FIGS. 10–12. The alternative skeletal support frame 200 also includes a plurality of longitudinal splines 268 having spaced grooves 260 for accommodating a wrapped resistance heating wire (not shown). The longitudinal splines 268 are preferably held together with spaced ring supports 266. The spaced ring supports 266 include a "wagon wheel" design having a plurality of spokes 264 and a hub 262. This provides increased structural support over the skeletal support frame 70, while not substantially interfering with the preferred injection molding operations.

Alternatively, the polymeric coatings of this invention can be applied by dipping the disclosed skeletal support frames 70 or 200, for example, in a fluidized bed of pelletized or powderized polymer, such as PPS. In such a process, the resistance wire should be wound onto the skeletal supporting surface, and energized to create heat. If PPS is employed, a temperature of at least about 500° F. should be generated prior to dipping the skeletal support frame into the fluidized bed of pelletized polymer. The fluidized bed will permit intimate contact between the pelletized polymer and the heated resistance wire so as to substantially uniformly provide a polymeric coating entirely around the resistance heating wire and substantially around the skeletal support frame. The resulting element can include a relatively solid structure, or have a substantial number of open cross-sectional areas, although it is assumed that the resistance heating wire should be hermetically insulated from fluid contact. It is further understood that the skeletal support frame and resistance heating wire can be pre-heated, rather than energizing the resistance heating wire, to generate sufficient heat for fusing the polymer pellets onto its surface. This process can also include post-fluidized bed heating to provide a more uniform coating. Other modifications to the process will be within the skill of current polymer technology.

The standard rating of the preferred polymeric fluid heaters of this invention used in heating water is 240 V and 4500 W, although the length and wire diameter of the conducting coils 14 can be varied to provide multiple ratings from 1000 W to about 6000 W, and preferably between about 1700 W and 4500 W. For gas heating, lower wattages of about 100–1200 W can be used. Dual, and even triple wattage capacities can be provided by employing multiple coils or resistance materials terminating at different portions along the active element portion 10.

From the foregoing, it can be realized that this invention provides improved fluid heating elements for use in all types of fluid heating devices, including water heaters and oil space heaters. The preferred devices of this invention are mostly polymeric, so as to minimize expense, and to substantially reduce galvanic action within fluid storage tanks. In certain embodiments of this invention, the polymeric fluid heaters can be used in conjunction with a polymeric storage tank so as to avoid the creation of metal ion-related corrosion altogether.

Alternatively, these polymeric fluid heaters can be designed to be used separately as their own storage container to simultaneously store and heat gases or fluid. In such an embodiment, the flow-through cavity 11 could be molded in the form of a tank or storage basin, and the heating coil 14 could be contained within the wall of the tank or basin and energized to heat a fluid or gas in the tank or basin. The heating devices of this invention could also be used in food warmers, curler heaters, hair dryers, curling irons, irons for clothes, and recreational heaters used in spas and pools.

This invention is also applicable to flow-through heaters in which a fluid medium is passed through a polymeric tube containing one or more of the windings or resistance materials of this invention. As the fluid medium passes through the inner diameter of such a tube, resistance heat is generated through the tube's inner diameter polymeric wall to heat the gas or liquid. Flow-through heaters are useful in hair dryers and in "on-demand" heaters often used for heating water.

Although various embodiments have been illustrated, this is for the purpose of describing and not limiting the invention. Various modifications, which will become apparent to one skilled in the art, or within the scope of this in the attached claims.

We claim:

1. A method of manufacturing an electrical resistance element comprising:

(a) providing a support structure having a plurality of openings therethrough and a support surface thereon;

(b) disposing a resistance heating wire on said support surface; and (c) molding a thermally-conductive polymeric material over said resistance heating wire and a major portion of said support structure to electrically insulate and hermetically encapsulate said wire and a major portion of said support structure, said thermally-conductive polymeric material contacting said resistance heating wire, where the electrical resistance element is an electrical resistance element for heating a fluid, the support structure is a skeletal support frame comprising a plurality of longitudinal splines, and said wire and a major portion of said support structure are encapsulated from said fluid, wherein step (a) comprises injection molding said skeletal support frame, and step (c) comprises injection molding said thermally-conductive polymer to encapsulate said resistance heating wire and at least about 90 percent of said skeletal support frame wherein the remaining portion of said skeletal support frame that is not encapsulated comprises a plurality of heat transfer fins.

2. The method of claim 1 wherein said longitudinal splines have a plurality of grooves for receiving said resistance heating wire.

3. The method of claim 1 wherein said skeletal support frame and said thermally-conductive polymer comprise a common thermoplastic resin.

* * * * *